(12) United States Patent
Samuels et al.

(10) Patent No.: US 8,336,216 B2
(45) Date of Patent: Dec. 25, 2012

(54) LOW VELOCITY PROJECTILE AIMING DEVICE

(76) Inventors: Mark A. Samuels, Johns Creek, GA (US); Richard L. Fowler, Dacula, GA (US)

( * ) Notice: Subject to any disclaimer, the term of this patent is extended or adjusted under 35 U.S.C. 154(b) by 160 days.

(21) Appl. No.: 12/826,391

(22) Filed: Jun. 29, 2010

(65) Prior Publication Data
US 2011/0120438 A1    May 26, 2011

Related U.S. Application Data

(60) Provisional application No. 61/269,970, filed on Jul. 1, 2009.

(51) Int. Cl.
*F41G 1/467* (2006.01)

(52) U.S. Cl. ............................................. 33/265; 124/87

(58) Field of Classification Search .................... 33/227, 33/265, 276
See application file for complete search history.

(56) References Cited

U.S. PATENT DOCUMENTS

| | | | | |
|---|---|---|---|---|
| 3,526,037 | A * | 9/1970 | Crosby | 33/265 |
| 4,418,479 | A * | 12/1983 | Stachnik | 33/265 |
| 4,617,741 | A * | 10/1986 | Bordeaux et al. | 33/228 |
| 6,397,483 | B1 * | 6/2002 | Perkins | 33/265 |
| 7,614,156 | B1 * | 11/2009 | Imig | 33/265 |
| 7,805,847 | B2 * | 10/2010 | Behr | 33/265 |
| 2009/0165314 | A1 * | 7/2009 | Khoshnood | 33/265 |
| 2011/0259309 | A1 * | 10/2011 | Oppenheim | 124/88 |
| 2012/0042863 | A1 * | 2/2012 | Smith et al. | 124/87 |

* cited by examiner

*Primary Examiner* — G. Bradley Bennett
(74) *Attorney, Agent, or Firm* — Ballard Spahr LLP (57) ABSTRACT

Provided are devices for determining the correct aiming point of a low velocity projectile and methods and systems for using the devices. For example, the devices can be attached to a bow and used to improve accuracy for hunting game.

20 Claims, 10 Drawing Sheets

LOW VELOCITY PROJECTILE AIMING DEVICE

CROSS-REFERENCE TO RELATED APPLICATIONS

This application claims the benefit of U.S. Provisional Application No. 61/269,970, filed Jul. 1, 2009, which is incorporated by reference in its entirety as part of this application.

FIELD OF THE INVENTION

This invention relates generally to systems and methods for aiming and firing low velocity projectiles.

BACKGROUND

The major drawback of a low velocity projectile device like a bow is the parabolic trajectory of the projectile, requiring accurate distance and angle estimation, particularly at hunting or combat distances. For example, using a bow at a distance of 35 yards, a range estimation error of as few as two or three yards can cause a complete miss on a deer-size target. To further complicate matters, a downhill shot, for example one from an elevated tree stand or window, causes the projectile to fly higher than would be the case in a horizontal shot at the same distance. The same applies to an uphill shot. Skilled bowhunters develop their range-estimation ability through dedicated practice in field conditions, some shooting "instinctively", i.e. without the use of sights or even conscious range-estimation. This requires long hours of practice under varying conditions which is not practical for many hunters. In addition, to develop a high level of skills for combat applications of a low velocity projectile, a significant number of training rounds must be expended at a high cost in both training material and time.

Archery has been practiced by many nations for millennia. The principle of guiding an arrow accurately to a target has been used to provide sustenance, for sport, and in some cultures has attained a spiritual quality. The basic principles of archery have remained largely unchanged with respect to today's practice of archery.

Part of archery's allure is the difficulty required in attaining effective archery shooting skills. Many hours of discipline and practice are required to accurately hit a still target. Still more discipline and skill are required to hit a target in motion. Many archers who are proficient at hitting a still target are ultimately unsuccessful when shooting at a moving target. The moving target requires that the archer mentally compute a ballistic solution that includes an estimation of a "lead" or an aim point slightly ahead of the moving target so that an arrow fired at a point in space reaches this point in space the same instant in time as the target. The leading skill is desirable to effectively hunt and it must be practiced for the archer to become proficient in the leading skill. Much of this skill involves the archer developing a "sense" or skill at target motion estimation determining target speed and combining this "sense" with a familiarity with a bow and arrow. The velocity of an arrow is dependent upon the draw weight of the bow which the archer is shooting. The archer must know the velocity of the arrow at a given draw of the bow, or as in developing the leading skill, the archer must become very familiar with the archer's own equipment such that all variables in the ballistic calculation are "sensed" or known by the archer. These "senses" can only be acquired with substantial practice and integration of the archer's physical and mental processes. This integration of mind and body is responsible for much of the enjoyment experienced by seasoned archers.

For simplicity, our discussion will focus on hunting applications although applicable to any low velocity projectile, such as the M-203 grenade launcher and other devices.

Simple sights have long been known for use with archery bows and other low velocity projectile weapons, i.e. those with an exit velocity below approximately 1000 fps. They range from simple pin markers to peep sights, to vertically aligned series of horizontal pins mounted in a generally annular frame to protect the pins. These latter multi-pin sights have proliferated in the last few years, especially in the hunting arena, where the distance to a target or target animal can vary as much as from 10 to 60 yards. In the bow hunting situation, the trajectory of an arrow must be accurately predicted if an archer is to have any confidence in accurate shot placement. Since the typical range to a target may vary substantially, it is critical that a good estimate of the distance for a particular shot be known with some degree of accuracy. The archer typically has to use a remote measuring device or physically measure the distance to an anticipated target location from the archer's tree stand, blind, or other shooting location. Alternatively he or she must simply guess as to the appropriate distance in order to compensate for the effects of gravity on an arrow in flight to the target. In the past, there have been few tools to aid the shooter in this endeavor.

One such tool has been a multiple position sight which can be a pin sight in the case of archery or a leaf sight in the case of a grenade launcher. Normal multi-pin sights simply have several brass aiming pins which stick out horizontally from a vertical frame mounted in front of the hand grip on the bow. Each pin provides an aiming point from the shooters eye position useful for a particular target distance. The archer visually estimates the appropriate range and then sights to the target using the appropriate aiming pin corresponding to that range. Recently an enhancement to the multi-pin sight has been introduced. This sight has light gathering fiber optic filaments which provide a self powered illuminated dot that the archer sees at the end of each aiming pin. These fiber optic multiple pin sights have greatly improved the utility of such sights in low light or low contrast lighting situations.

Hand-held range-finding instruments are available and present one solution to the problem, but are awkward to use and require extra movement at a time when any movement is undesirable. Crude range estimation devices for hunting use are available, relying on spaced stadia wires subtending a set angle, which brackets an "average" deer's chest at certain specified distances, but these are not widely used owing to wide variations in body size within and between species. Neither aid corrects for differences in elevation between the target and the archer.

Sophisticated bow-mounted aids are known. These fall into two main classes: the first comprises sights incorporating optical range-finders which measure the line-of-sight distance but not the angle of inclination or declination to the target; the second class relies on measurement of the angle of declination from an elevated shooting position but not the line-of-sight distance to the target.

Aids of this first type include U.S. Pat. No. 3,136,697 dated Dec. 29, 1964, claiming an optical range-finder based on a dual spaced mirror device and coupled sighting element; U.S. Pat. No. 2,788,701, dated Apr. 16, 1957, claiming the use of a multi-mirror device; U.S. Pat. No. 4,555,856, dated Dec. 3, 1985, claiming a third adjusting compensating mirror and cam-coupled sight pin; U.S. Pat. No. 4,646,444, dated Mar. 3, 1987, claiming a self-indicating planar/parabolic mirror combination; and U.S. Pat. No. 4,178,693 claiming a two-mirror, split image bowsight incorporating a cam-controlled alignment mechanism. All of these devices are accurate only when the shot is approximately level, and where one or more sight components are customized to the specific shooter, bow, and projectile. For example, the inventions described in the U.S. Pat. Nos. 4,178,693 and 4,555,856 must be customized by highly sophisticated mathematical modeling techniques or by trial and error. The invention described in the U.S. Pat. No. 4,646,444 is provided with means of adjustment relying on the deflection of a flexible, variable thickness mirror-however it does not have precise horizontal aiming point providing suitable alignment with a particular spot on a nondescript target such as a deer.

The second class of aids includes U.S. Pat. No. 4,120,096 dated October 1978, claiming a pivoted sight whose position relative to the sight picture is appropriately elevated as the bow is tilted from the horizontal; U.S. Pat. No. 4,796,364, dated Jan. 10, 1989, claiming a dual sight comprising a pendulum sight for shooting from an elevated position and a multi-pin sight for use on level ground, each of which can be secured out of the archer's line-of-sight when not in use; U.S. Pat. No. 4,711,036, dated Dec. 8, 1987, claiming two versions of a pendulum-actuated sight; U.S. Pat. No. 4,325,190, dated Apr. 20, 1982 claiming a plurality of sights selectively illuminated according to the angle of declination of the bow via an electronic circuit incorporating a plurality of switches; and U.S. Pat. No. 4,400,887, dated Aug. 30, 1983, claiming a plurality of sights and a means for selectively causing one pin to be readily distinguishable from the others according to the angle of declination of the bow, via a pendulum-mounted colored lens positioned to selectively interrupt multiple fiber-optic cables. None of these devices serves as a range-finding aid on level or upwardly sloping ground, nor do they function properly where the elevation of the archer relative to the target is unknown (for example where the elevated stand is situated above sloping ground) or where the archer is significantly above or below the restricted height range for which the sight is calibrated. Furthermore, except for the precalibrated multi-pin sights of the U.S. Pat. Nos. 4,325,190 and 4,400,887, all of these aids provide the same sight correction for all bow/shooter/projectile combinations. In practice, the vast majority of bow hunters shoot and hope for the best, resulting in a higher incidence of poor hits and lost game than would be the case if an accurate range-finding sight were used. Indeed, increasing controversy over the humaneness of the bow as a hunting weapon in the hands of the average hunter mandates the development of such a device.

Laser rangefinders are available and well known in the art (such as described in U.S. Pat. Nos. 6,108,071, 5,379,676, and 6,073,352 incorporated herein by reference) however they are separate devices that require separate movement and action to initiate in a time when seconds count. In addition, once the laser distance is determined, a visual estimate is still required to interpolate between fixed pin positions.

To address the accuracy of range estimating, laser rangefinders have been developed and marketed by a variety of companies, including Laser Atlanta, Leica, Bushnell and Nikon among others. These rangefinders enable the determination of the distance to the target, however the archer still has to choose which of several sighting pins to align with the target based on the distance displayed or manually adjust the pin using the technique shown in U.S. Pat. No. 6,494,604 based on the distance determined so that the aiming pin represents the correct solution to the ballistics equation. For example, if the archer has preset the pins to distances of 10, 20, 30, 40, and 50 yards, the archer would choose the pin closest to the displayed target distance. In one model, the Bushnell laser rangefinder is integral with the multiple pin sight. The entire sight may be removed from the bow and used as a hand held distance measurement device. In another example, the rangefinder is modular and may be removed from the bowsight for use as a hand held distance measuring device.

One of the major disadvantages with the use of a rangefinder is that it only indicates the range when aimed directly (i.e., via line of sight) at the target. Thus, after the range is determined, the archer must raise the bow such that the appropriate distance pin of the bow sight is aligned with the target. The archer may choose the incorrect pin with which to aim at the target, resulting in a missed shot. Another disadvantage is that the rangefinder alone does not automatically compensate or adjust for the angle from which the shot is being fired. Another disadvantage is the rangefinder alone is very difficult to use with moving targets, especially targets running away from the archer or shooter or running toward the archer or shooter. Hunters often fire an arrow from an elevated position and in some instances fire upward at an angle. Hunting birds may require shooting at an angle at a moving target which could be very difficult. There is also a need to record images of the target animal and several devices have been developed to include a camera on a bow, however none of those devices are fully integrated with a sight device as described herein.

Therefore there is a need for an integrated bow sight that automatically compensates for the angle from which the projectile or arrow is being fired Therefore there is a need for a versatile archery or low velocity sight which automatically tells the archer or shooter where to aim when aiming at a particular target so as to avoid the potential for missing the target. Because projectile velocity is critical to solving the ballistic equation, knowledge of arrow velocity is needed. This velocity can be measured prior to a hunt and stored, however changes in temperature and humidity and other factors can changes the arrow velocity, therefore there is a need to predict arrow velocity based on conditions instant to the projectile launch and a need to measure actual arrow velocity as the arrow is fired and a need to store and update specific arrow velocities in each arrow so that minute differences in arrow speed can be included in the ballistic algorithm

SUMMARY

The primary object of the present invention is to provide an sight for low velocity projectile launching device that automatically adjusts an aiming point to the true aim point for a given target compensating for the low velocity projectile launching device ballistic characteristics, projectile ballistic characteristics, distance and height differences between the low velocity projectile launching device and the target.

One preferred embodiment of the present invention provides an integrated sight comprised of the following: movable aiming pin, a rangefinder, inclinometer, operator control mechanism, a true aim point compensation calculator and display of target distance that is attached to a low velocity projectile launching device. The operator aims at a target with the movable aiming pin in the line of sight (LOS) position and activates the operator control mechanism, the rangefinder measures the distance, the inclinometer measures the aiming angle, the display displays the range, the true aim point (TAP) compensation calculator LOS position to the TAP position. The low velocity projectile launching device is then fired by the operator.

A second preferred embodiment of the present invention provides an integrated sight comprised of the following: movable illuminated ("red-dot") aiming point, a rangefinder, inclinometer, operator control mechanism, a true aim point compensation calculator and display of target distance that is attached to a low velocity projectile launching device. The operator aims at a target with the movable aiming point in the LOS position and activates the operator control mechanism, the rangefinder measures the distance, the inclinometer measures the aiming angle, the display displays the range, the true aim point compensation calculator calculates the TAP and moves the movable aiming point from the LOS position to the TAP position. The low velocity projectile launching device is then fired by the operator.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE FIGURES

DETAILED DESCRIPTION OF THE INVENTION

The present invention is a sight which not only allows the accurate estimation of range, but also indicates which aiming point to use, taking into account a variety of factors which include but are not limited to deviations from the horizontal, arrow velocity, arrow speed, angular velocity and range, atmospheric and environmental conditions, limb strain or other similar energy storage measurement. In addition, a camera can be integrated which provides a visual record of the scene at the instant of the shot which could be activated by the shock and vibration of the projectile launch. The device measures the distance and angle to the target, indicating the appropriate aiming point by means of an indicator that has a position that is automatically adjusted. The range-finding mechanism can be hand or finger operated or activated by other techniques allowing the hunter to draw, estimate, aim, and release in one fast, fluid movement. Finally, the sight is designed to attach to the standard bushings or mounts provided by manufacturers, allowing easy installation without special tools.

The invention includes an integrated aiming device for a projectile launching device comprising a means of measuring distance, an aiming point adjustable in one or more axis and a means of determining the true aim point (TAP). The device could further include: a one or more axis inclination, an acceleration measuring device where the distance measuring is an electronic rangefinder, where the adjustable aiming point is one or more movable pins or light sources, where the adjustable aiming point is adjustable via a movable mirror, where the adjustable aiming point is adjustable via display of one or more powered or unpowered light sources, where the aiming point can be adjusted in two axis, that is low cost and lightweight, that includes a means of attaching to the projectile launching device and that is battery powered. The invention can also include: a device and method for displaying an adjustable aiming point by moving one or more light sources and device and method for displaying an adjustable aiming point by tilting a reflective surface. The invention includes a method for displaying an adjustable aiming point by changing the spectral output of a light source The invention includes method for displaying an adjustable aiming point by activating a bimetallic or other shape changing material.

The invention includes a device for displaying the correct aiming point for a projectile launching device comprising a processor for calculating the correct aiming point of the projectile launching device using one or more of the following information: range, projectile characteristics, environmental characteristics, launcher characteristics, one or more axis inclinometer output, elevation measurement, relative wind velocity, wind direction and temperature. The invention includes a means for displaying a line of sight (LOS) aiming point suitable for aligning a rangefinder with a target and displaying the true aiming point for the projectile launching device.

The invention includes a method of operating the system described herein comprising operation of a control device which selects from displaying the LOS aiming point or the true aiming point. The invention includes a method of operating the system described herein comprising operation of a control device which actives the ranging device and displays the LOS aiming point when the control device is activated and deactivates the ranging device and/or the LOS aiming point when deactivated.

The invention includes method of allowing the visual identification of the LOS and true aiming points by differences in color, shape or modulation.

The invention includes a method of calculating the position of an adjustable aiming point for a projectile comprising calculating the elevation of the launch point, the inclination and the speed of the projectile. Suitable equations for making these calculations can be found in the ballistics program: BALLISTIC v4.13, Copyright 1988-1995, William R. Frenchu or in Modern Exterior Ballistics: The Launch and Flight Dynamics of Symmetric Projectiles by Robert L. McCoy which are both incorporated herein by reference.

Sensors such as strain sensors can be placed on the limbs of the bow or integrated into the bow string so that an indication can be made of the stored energy and used in calculating the resultant velocity of the projectile. Suitable strain sensors are described in United States Patent Application Publication Number 20070068270 which is incorporated herein by reference.

Optionally, a camera, that could be activated by the firing of the projectile by using one of several possible sensors, can be placed into the system so that a visual record of the arrow impact can be made. Information from environmental sensors that measure the temperature, altitude and humidity can be employed to provide additional information for use in an algorithm.

The invention includes a method of storing historical velocity information in the arrow or in the memory of the device described herein. The system can obtain the information from the projectile or simply identify the projectile itself by means of a device such as an RF chip or a bar code or other suitable means and look up its previously stored velocity information and communicating this information to the system or device described herein in order to more accurately calculate the aiming point. The invention includes a method of measuring the velocity of a projectile by placement of two or more points on the projectile (such as a bar code) which can be detected as they pass a fixed point in order to measure the transit time of the marks (by means of an IR transmit/receive pair) and knowing the time interval through the microprocessor or clock), calculate the velocity of the projectile just launched. The invention includes a method for transmitting or storing the calculated velocity and a unique identifier to the projectile as it is leaving the system (by transmitted RF) so that information can be stored on the projectile or in system memory and used the next time that projectile is launched.

Figure 10:
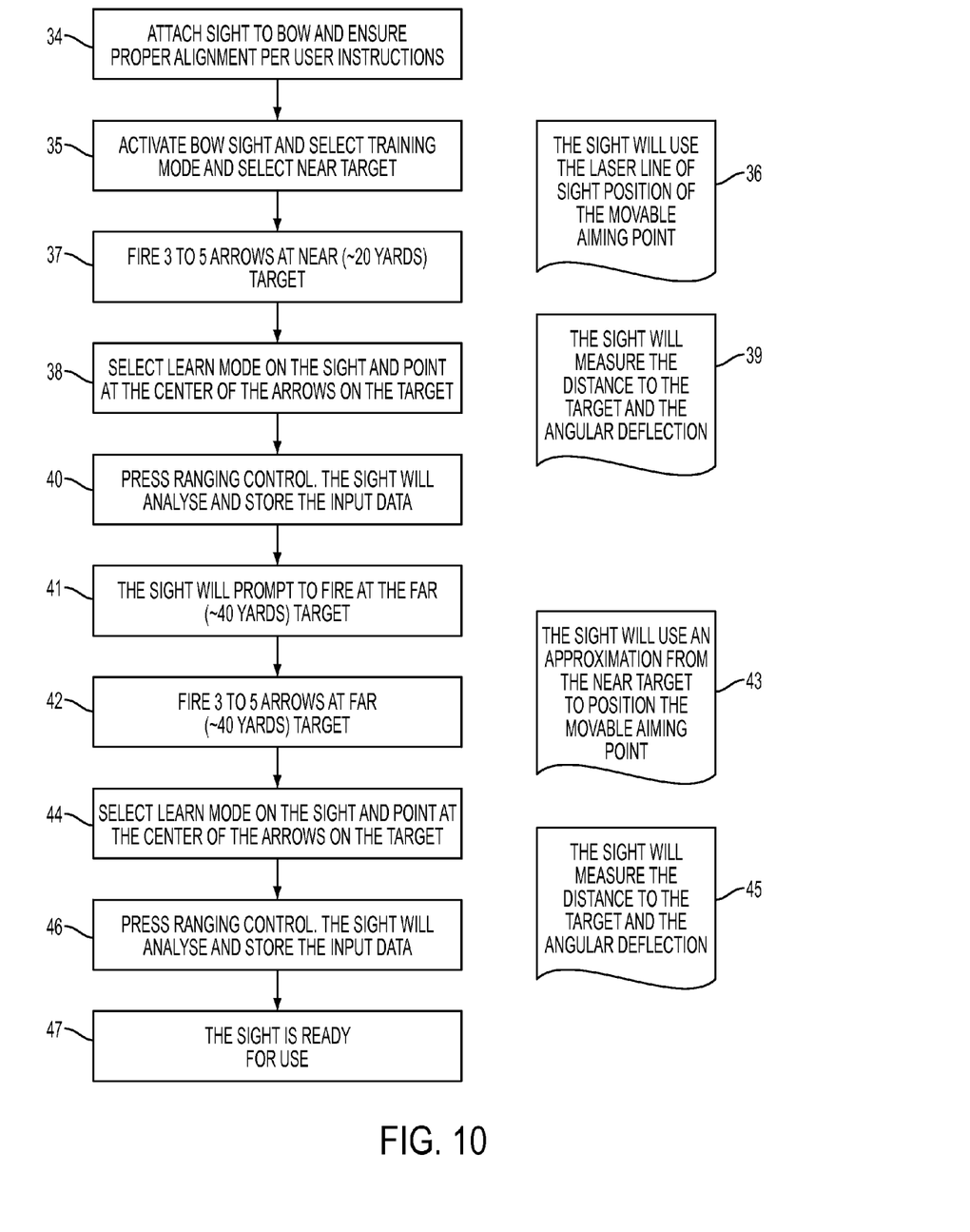
FIG. 10 is a flowchart that illustrates the training sequence to determine the ballistic coefficients of the low velocity projectile launching device from a predetermined training sequence.

The flow chart depicted in FIG. 10 shows a potential embodiment of the training sequence to determine the ballistic coefficients of the low velocity projectile launching device from a predetermined training sequence.

The first step 34 of the training sequence is to mount and align the sight to the low velocity projectile device.

The next step 35 is to activate the sight, select a near target and select the training mode on the sight.

The next step 37 is to fire 3 to 5 projectiles at the near target. The near target is located approximately 20 yards from the sight. For the near target the sight may employ the laser line of sight position of the movable aiming pin per step 36. The sight will measure the distance and pointing angle to the target.

The next step 38 is to point the sight at the center of the previously fired arrows and to activate the learn mode. The sight will derive ballistic coefficients from the position of the arrows relative to the aim point such as distance to the target and angular deflection 39. The user will press ranging control to initiate the sight to analyze and store the input data according to step 40.

The next step 41 is to fire 3 to 5 projectiles at the far target. The far target is located approximately 40 yards from the sight. For the far target the sight may employ an approximation of the TAP for the movable aiming pin. The sight will measure the distance and pointing angle to the target according to step 43.

The next step 44 is to point the sight at the center of the previously fired arrows on the far target and to activate the learn mode.

The sight will derive ballistic coefficients from the position of the arrows relative to the aim point such as distance to the target and angular deflection 45. The user will press ranging control to initiate the sight to analyze and store the input data according to step 46. The sight is ready to use per step 47.

Figure 1:
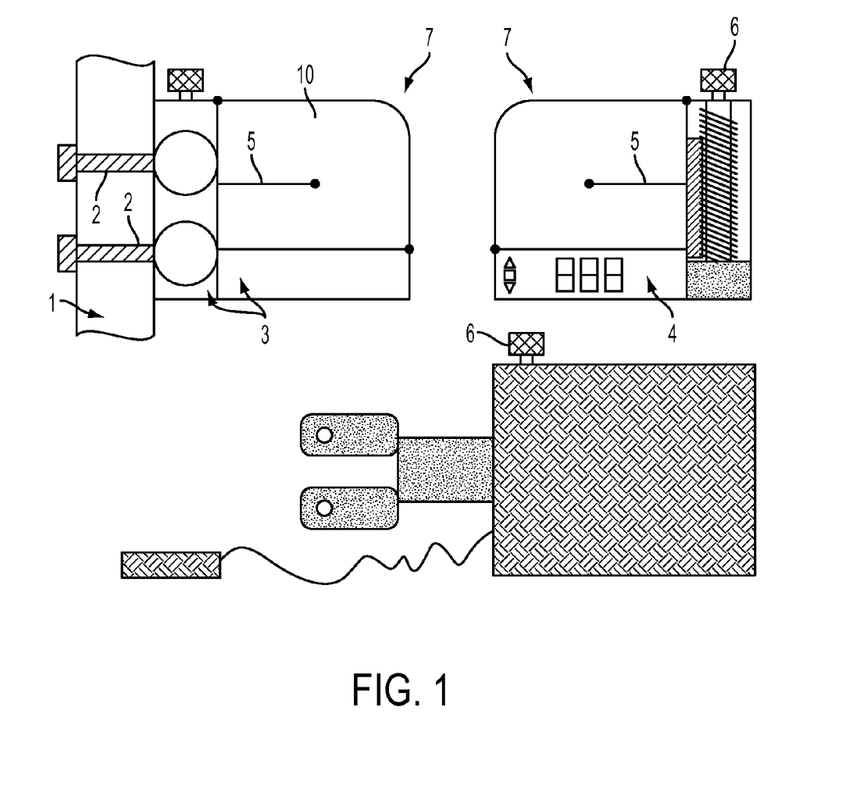
FIG. 1 is a user's view of one preferred embodiment of the invention mounted to a bow.

The drawing shown in FIG. 1 depicts the invention and its relationship to the bow 1 to which the invention is attached by means of screws 2 passing through holes in the mounting mechanism which is attached to the housing. Said housing contains a single or multiple enclosure(s) 3 to house the elements of the distance-measuring device, the display 4, control electronics, power elements, and the movable pin. The moveable pin mechanism moves the moveable aiming pin 5 either automatically or manually by means of thumbscrew 6 in case of electronic failure. The housing also has a viewing path 10 through which the operator views the target that is superposed with the movable pin 5. A housing 7 around the viewing path can be used to protect the movable pin 5. The display 4 displays the range to the target measured by the distance measuring device 8.

Figures 2A, 2B:
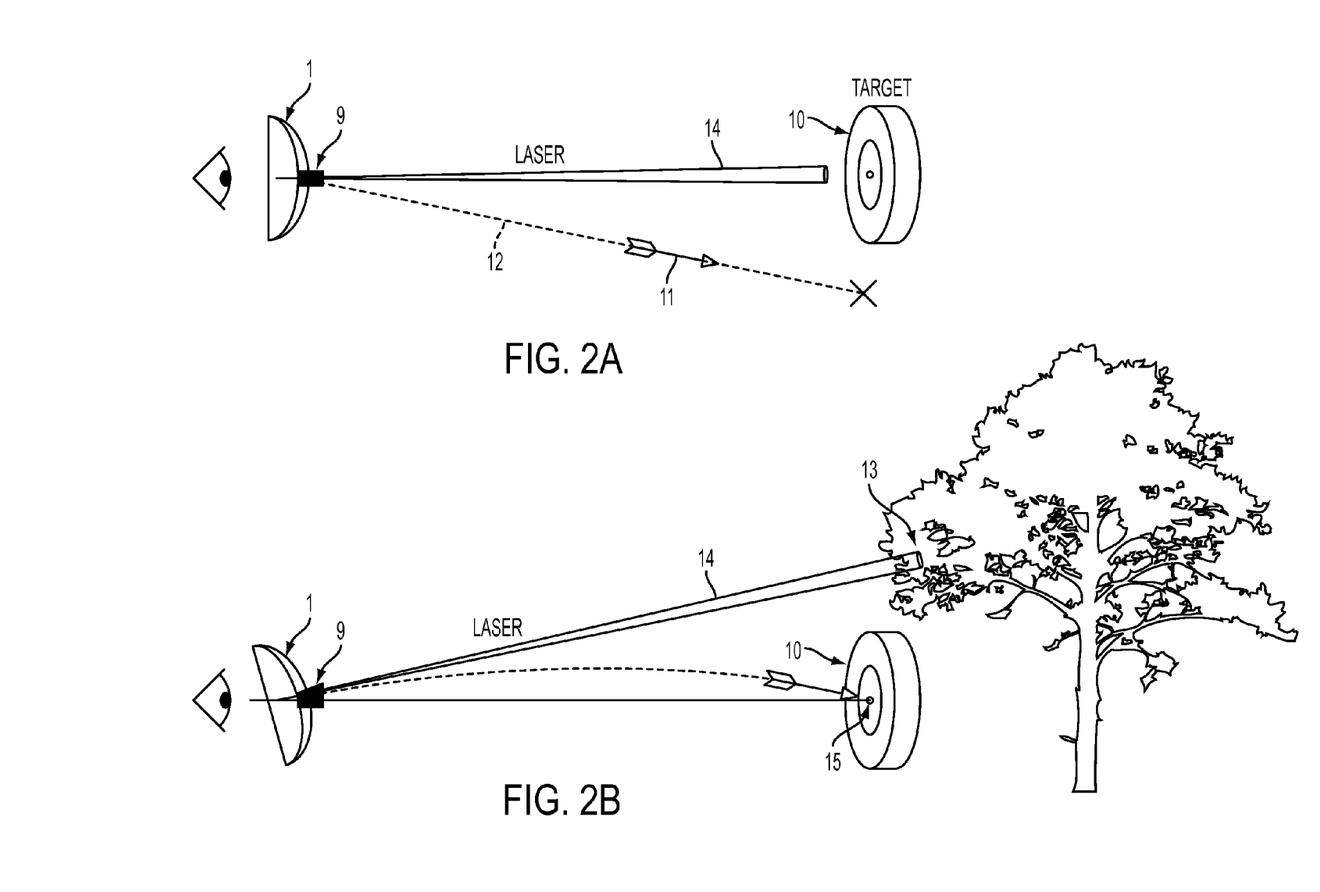
FIG. 2 is a scene of an archer taking aim at a target animal showing the difference between the laser line of sight and the projectile aiming point.

FIG. 2A depicts the geometric relationship of the targeting problem using a laser rangefinder 9 with a laser beam 14 with a bean divergence of 3 to 4 milliradians producing a spot size 1" on a 12 inch diameter target 10 at 40 yards and with a desired strike zone diameter of 3'. The laser is positioned on the target 10 but the low velocity projectile (arrow) 11 misses the target strike zone by several feet due to the nature of the ballistic path 12 of the projectile. FIG. 2B shows the laser spot 13 positioned above the target 10 where it hits a tree and produces an incorrect range and the movable aiming pin 5 positioned at the TAP 15 superposed on the target setting the bow at the correct angle to have the projectile hit the target in the desired strike zone. Thus it is shown that for a low velocity projectile, a laser rangefinder cannot be positioned on a typical target at the same time the TAP is positioned on the target.

Figure 3A:
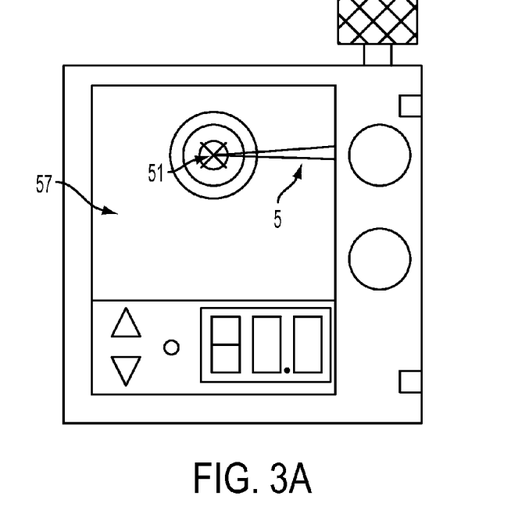
FIG. 3 is a user's view of one preferred embodiment of the invention showing the aiming points displayed on a target animal.
Figure 3B:
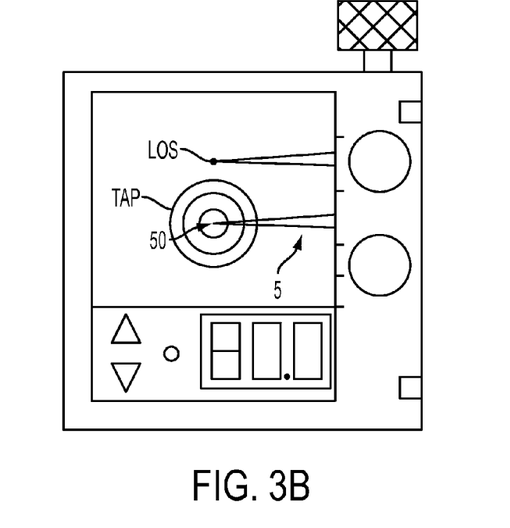

FIG. 3A show the same situation as in FIG. 2A as seen through the viewing tunnel 57 of the present invention. In the top view, the movable aiming pin 5 is in the laser line of sight aiming position (LOP) 51, and is shown with the laser rangefinder aligned to the target. In FIG. 3B, the movable aiming pin 5 is positioned at the TAP position 50 The TAP has been calculated by the true aim point compensation calculator (TACC) and the movable aiming pin 5 moved to the TAP 50 which requires the user to elevate the bow angle until the TAP 50 is positioned on the target and fire the weapon.

Figure 4:
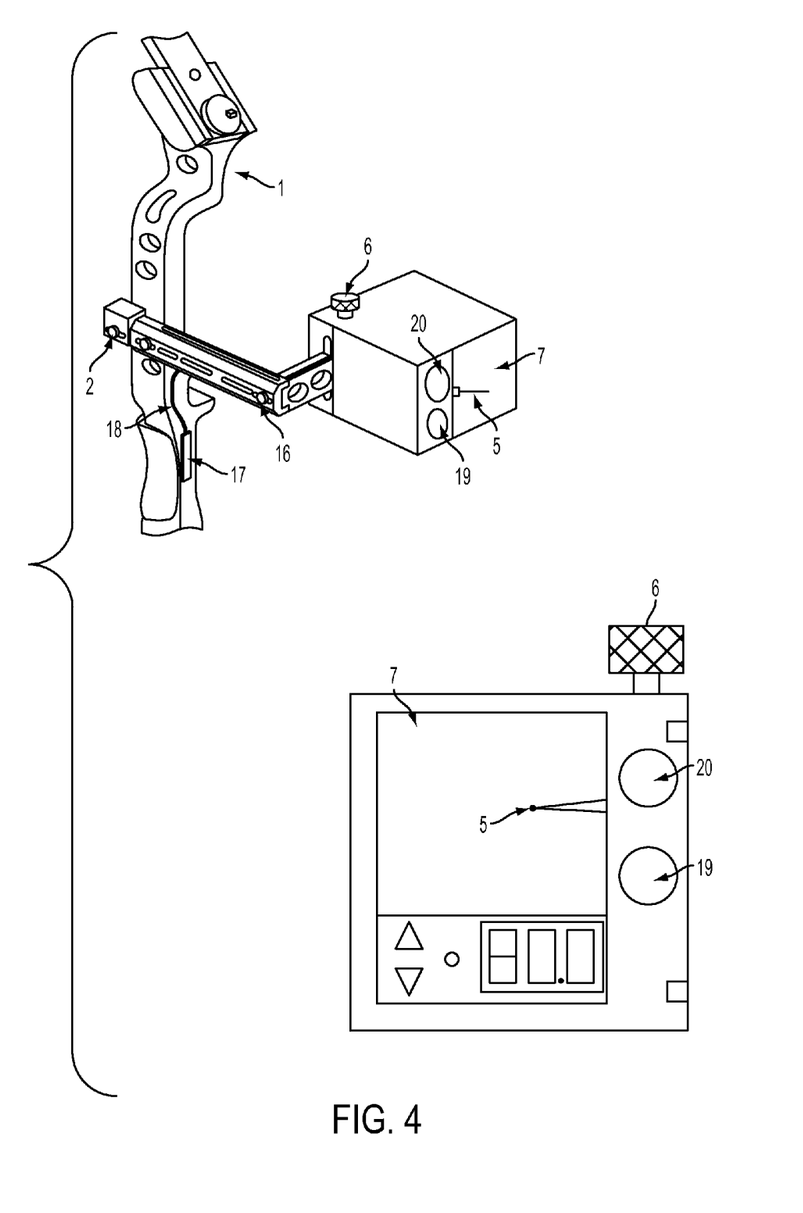
FIG. 4 is a perspective view of one preferred embodiment of the invention mounted to a bow in accordance with the invention.

FIG. 4 shows one preferred embodiment mounted by means of an adjustable mounting bracket 16 and screw 2 to a modern archery bow 1. A pressure sensitive switch operable by the user 17 is shown attached to the bow handle and connected to the housing via a wire 18. The manual pin adjustment knob 6 is shown at the top of the housing. The front of the housing on the side opposite the arrow shows a transmit 19 and receive lens 20 aperture for a laser rangefinder. The aiming tunnel 7 is shown with movable aiming pin 5.

Figure 5:
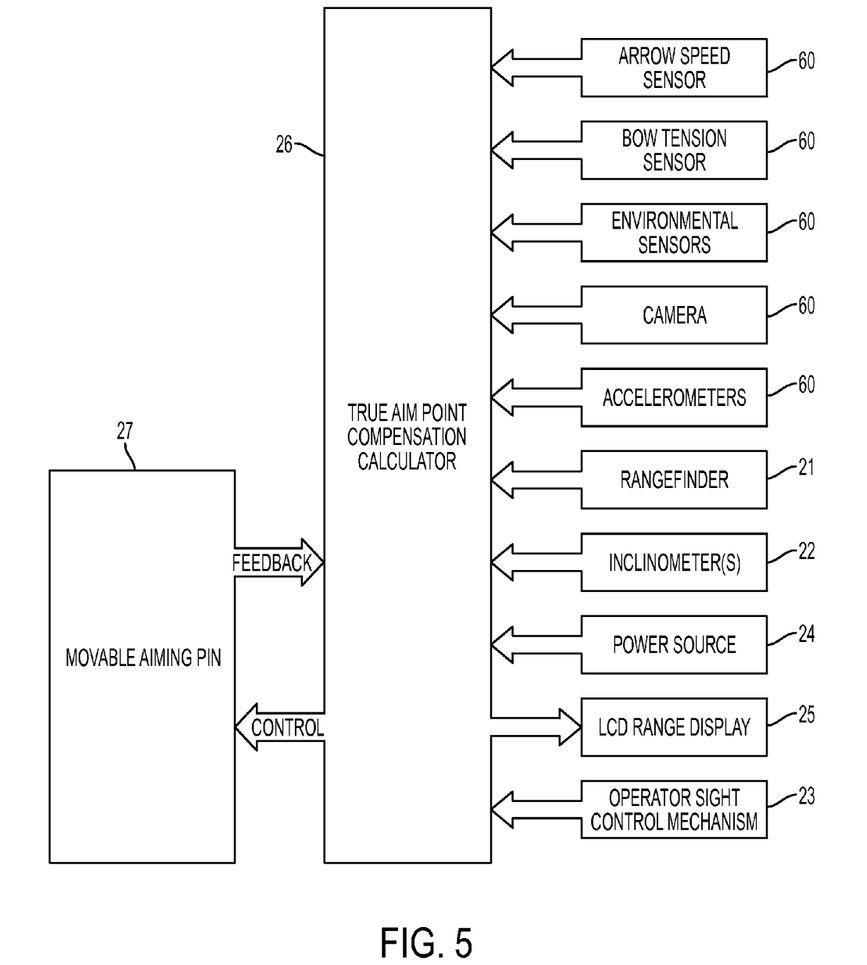
FIG. 5 is an electronic block diagram of the invention apparatus in accordance with the invention.

FIG. 5 shows a system block diagram detailing the components of one embodiment of the system. The block diagram shows a rangefinder 21 that provides distance information, an inclinometer 22 that provides one or more axis of angular information and a user input mechanism 23 that provides user information. Optionally, any of a number of sensors 60 (such as an accelerometer, a camera, environmental sensors, strain sensors and arrow speed sensor) can be employed to provide additional information for use in an algorithm. This information is provided to the true aimpoint compensation calculator (TACC) 26. The TACC 26 employs the information and one of many ballistic trajectory algorithms known to those skilled in the art to determine the angle at which the projectile must be fired in order to hit the target. This information is sent to the movable aiming pin mechanism 27 to adjust the position of the movable aiming pin. The movable aiming pin mechanism 27 provides feedback of its true position to the TACC 26 to insure the TAP is in the correct position. The TAP may be adjusted manually by means of the manual control knob 6 in the event of unit failure. Power is supplied to the system by the power source 24. The line of sight distance information is displayed to the user by the LCD Range Display 25.

Figure 6:
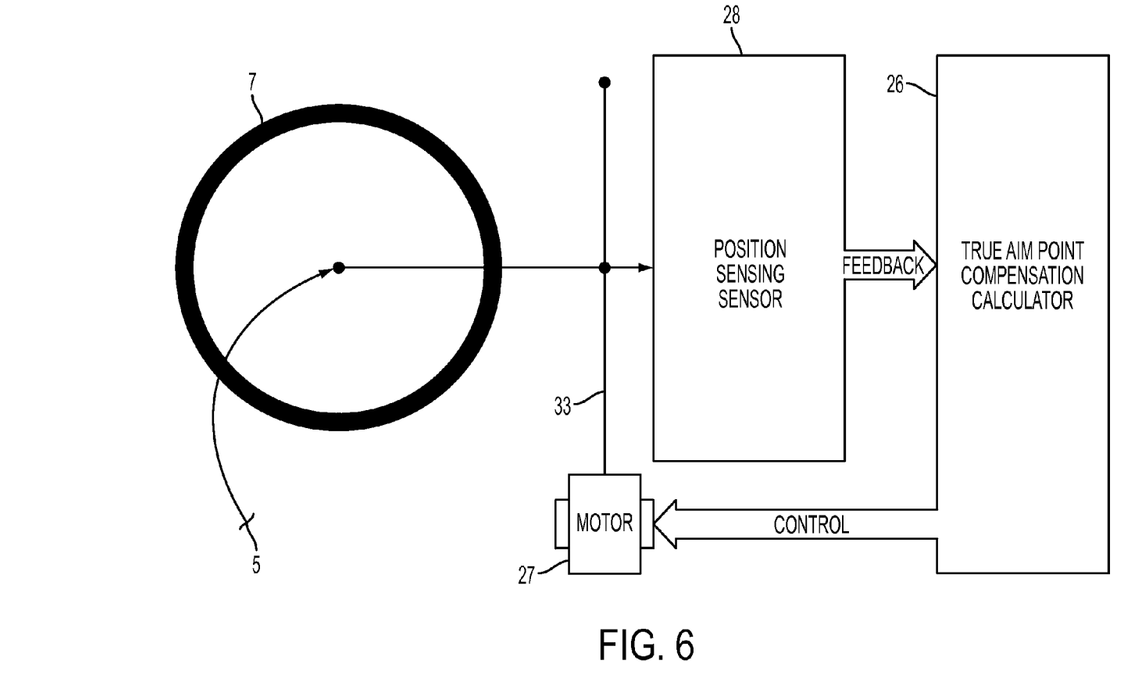
FIG. 6 is a schematic view of the aiming point moving mechanism using one preferred embodiment in accordance with the present invention.

FIG. 6 shows a block diagram of the components of one preferred embodiment. The movable aiming pin 5 is mechanically linked 33 to a motor 27 that can drive the position of the movable aiming pin 5 to any position within the optional sighting tunnel 7. The TACC 26 controls the position of the movable aiming pin 5 by means of an electrical drive signal to the motor 27. A feedback mechanism 28 may be connected to the movable aiming pin 5 to provide true position information to the TACC 26.

Figure 7:
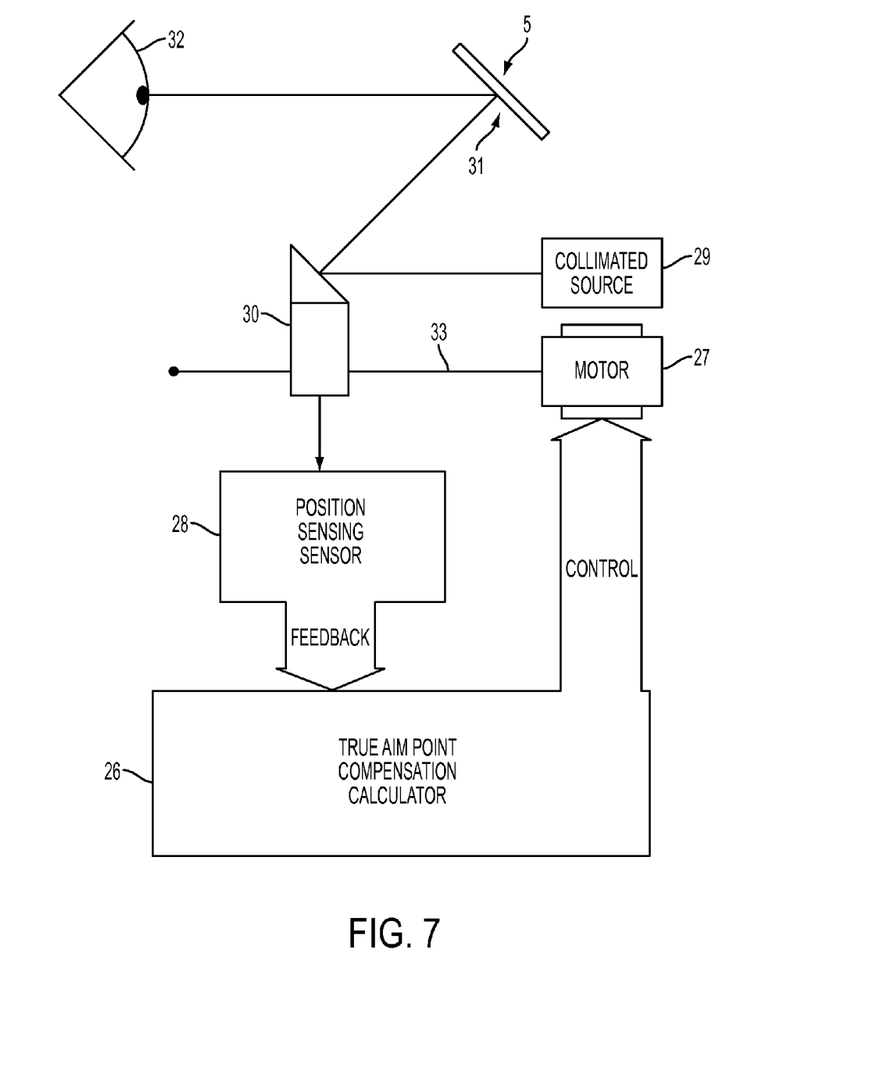
FIG. 7 is an optical schematic block diagram of a second embodiment showing the aiming point moving mechanism.

FIG. 7 shows a block diagram of the components of one preferred embodiment. In this embodiment the movable aiming pin 5 is a beam of collimated light 29 that is relayed to the operator's eye 32 by means of one or more reflecting surfaces 30, 31. The position of one or more of the reflective surfaces 30, 31 may be modified by one or more motors 27. The reflective surfaces may be mechanically linked 33 to a motor (s) 27 that can drive the position of the movable aiming pin 5 to any position within the Sighting Tunnel 7. The TACC 26 controls the position of the movable aiming pin 5 by means of an electrical drive signal to the motor 27. A feedback mechanism 28 may be connected to the movable aiming pin 5 to provide true position information to the movable aiming pin 5.

Figure 8:
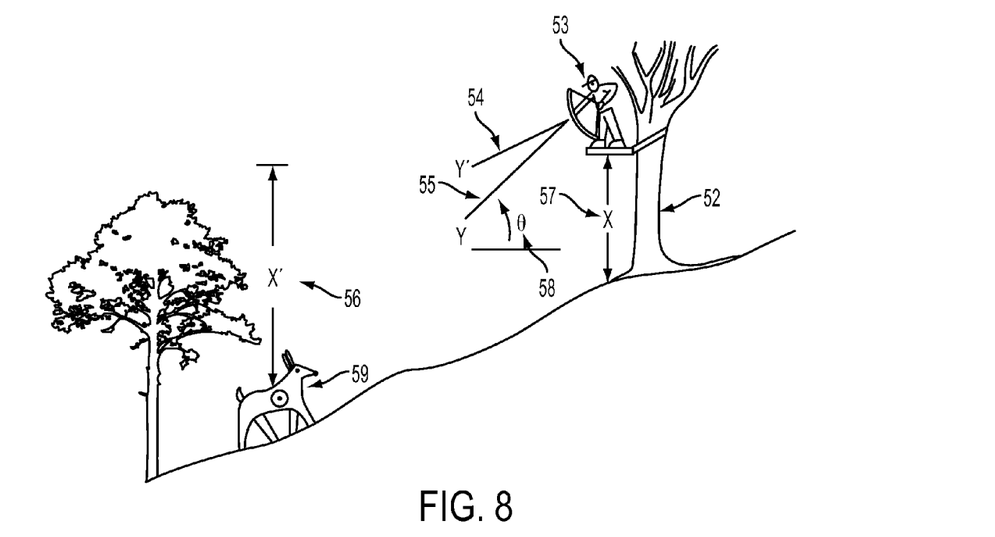
FIG. 8 shows the varying terrain expected to be found in a typical hunting situation with factors to be considered in determining the aiming point.

FIG. 8 shows the varying terrain expected to be found in a typical hunting situation. The hunter 53 is in a tree stand with an elevation X 57 above the earth. The target animal 59 is standing on sloped ground below the tree stand at a distance Y 55 and angle θ 58 from the hunter and various obstructions are apparent. The target animal 59 is a distance X' 56 below the hunter 53 and the path that the projectile will actually take is Y' 54.

The system of this invention takes one or more of these factors into account in determining the correct aiming point.

Figure 9A:
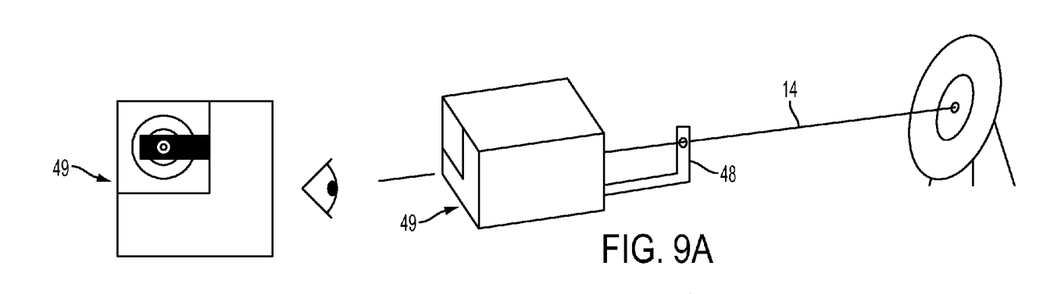
FIG. 9 is a view of a potential embodiment of the auxiliary sight used to align the sight to the low velocity projectile device.
Figure 9B:
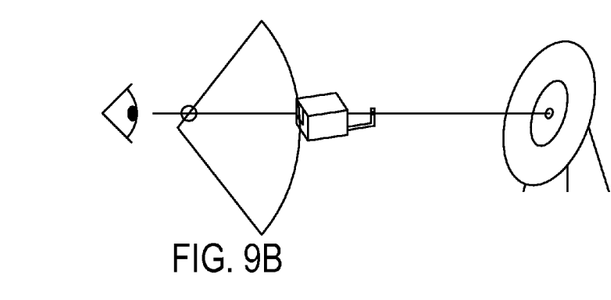
Figure 9C:
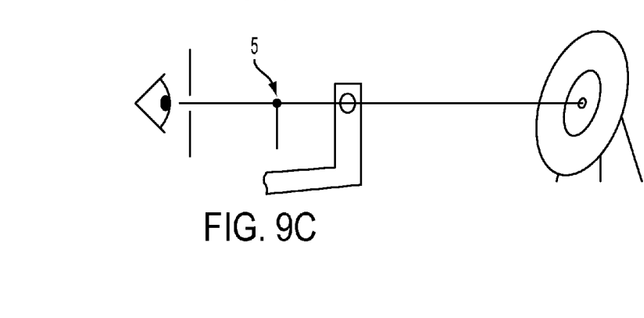

FIG. 9 is a view of a potential embodiment of the auxiliary sight 48 used to align the sight 49 to the low velocity projectile device. The auxiliary sight 48 and the movable aiming pin 5 in the laser line of sight position are aligned at the factory such that the auxiliary sight and movable aiming pin are precisely aligned along the laser path. Thus by aligning the low velocity projectile device to the auxiliary sight to the movable aiming pin in the laser line of sight position the sight can be aligned with the low velocity projectile device.

It is thus seen from the preceding description that the various elements of the present invention function together as an intelligent sighting device which not only allows the operator to measure the line-of-sight distance to a target, but also provides a highly visible indication of the proper angular correction for the trajectory of the arrow, automatically compensating for deviations in the angle of the shot from the horizontal. The mathematical principle upon which this correction is based is universal to combinations of shooting style and equipment, allowing economical mass-production of the device.

Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. An aiming device comprising:
   a means for measuring the distance to a line of sight aiming point;
   a visual indicator aligned to the means for measuring distance;
   a means for calculating a true aiming point using at least the measured distance to the line of sight aiming point; and
   a means for aligning the visual indicator to the true aiming point.

2. The device of claim 1, wherein the measuring means, the calculating means, the aligning means and the visual indicator are integrated into a single enclosure.

3. The device of claim 1, wherein the measuring means, the calculating means, the aligning means and the visual indicator are integrated into at least two discrete enclosures that are configured to be connected via a connecting means.

4. The device of claim 1, wherein the visual indicator comprises a first positionally-fixed visual indicator and a second visual indicator that is configured to be movable in at least one axis relative to the true aiming point.

5. The device of claim 1, wherein the means for calculating the true aiming point of the device further comprises at least one sensor selected from the group consisting of: strain sensors, axis inclinometers, accelerometers, gyroscopes, and humidity sensors.

6. The device of claim 1 further comprising a control device configured to:
   activate the means for measuring distance to a line of sight aiming point in an active mode; and
   activate the means for calculating a true aiming point and the means for aligning the visual indicator to the true aiming point in an inactive mode.

7. The device of claim 6, wherein the control device is configured to sequentially activate the respective active and inactive modes.

8. The device of claim 1, wherein the visual indicator changes at least one of color, shape or modulation to allow discrimination between the line of sight aiming point and the true aiming point.

9. The device of claim 1, wherein the means for aligning the visual indicator comprises a bimetallic or shape changing material.

10. The device of claim 1, wherein the aiming device is operably coupled to a projectile launching device that is operably coupled to a projectile; and wherein the means for calculating the true aiming point further comprises a processor having predetermined characteristics of the projectile stored thereon.

11. The device of claim 1, wherein the aiming device is operably coupled to a projectile launching device; and wherein the means for calculating the true aiming point further comprises a processor having predetermined characteristics of the projectile launching device stored thereon.

12. The device of claim 1, wherein the aiming device is operably coupled to a projectile launching device that is configured to launch a projectile; and wherein the means for calculating the true aiming point of the device further comprises at least one camera.

13. The device of claim 12, wherein the camera is activated by the launch of the projectile from the projectile launching device.

14. The device of claim 1, wherein the means for aligning the visual indicator comprises a movable mirror.

15. The device of claim 1, wherein the means of aligning the visual indicator comprises at least one light source.

16. The device of claim 15, wherein the at least one light source is selected from a group consisting of: a powered light source and an unpowered light source.

17. A method for training an aiming device to determine the ballistic coefficients of a low velocity projectile launched from a projectile launching device comprising:

Aligning the aiming device to the projectile launching device;

activating the aiming device and selecting a training mode;

firing at least one low velocity projectiles at at least one near target;

pointing the aiming device at the substantial center of the impacts of the previously fired low velocity projectiles on the near target;

activating a learning mode on the aiming device to derive at least one ballistic coefficient of the low velocity projectile relative to a line of sight aiming point to the near target;

firing at least one of low velocity projectiles at at least one far target;

pointing the aiming device at the substantial center of the impacts of the previously fired low velocity projectiles on the far target; and activating a learning mode on the aiming device to derive at least one ballistic coefficient of the low velocity projectile relative to a line of sight aiming point to the far target.

18. The method of claim 17, wherein the step of aligning the aiming device to the projectile launching device further comprises mounting the aiming device relative to the projectile launching device.

19. A method for sighting comprising the steps of:
providing a projectile launching device operably coupled with a projectile;
providing a line of sight aiming point operably coupled to the projectile launching device;
aligning a rangefinder with the line of sight aiming point;
measuring environmental parameters;
using a processor to calculate the true aiming point using the environmental parameters;
displaying the true aiming point to launch the projectile and contact the line of sight aiming point.

20. The method of claim 19 wherein the environmental parameters are selected from the group consisting of: range from the projectile launching device to a line of sight aiming point, projectile characteristics, projectile launcher characteristics, elevation, relative wind velocity, wind direction, acceleration of the projectile launching device, ambient temperature, and inclination of the projectile device.

* * * * *